United States Patent [19]

Maddever et al.

[11] Patent Number: 4,699,654
[45] Date of Patent: Oct. 13, 1987

[54] MELTING FURNACE AND METHOD FOR MELTING METAL

[75] Inventors: Wayne J. Maddever, Toronto, Canada; Michael F. Riley, Danbury, Conn.; Ronald J. Selines, North Salem, N.Y.

[73] Assignee: Union Carbide Corporation, Danbury, Conn.

[21] Appl. No.: 849,389

[22] Filed: Apr. 8, 1988

[51] Int. Cl.$^4$ ............................ C22B 4/00; C27C 5/52
[52] U.S. Cl. ............................ 75/10.45; 75/10.55; 75/10.61
[58] Field of Search ................ 75/10.45, 10.55, 10.61

[56] References Cited

U.S. PATENT DOCUMENTS

| 1,674,982 | 6/1928 | Moore | 75/10.61 |
| 3,689,250 | 9/1972 | Roeder | 75/10.55 |
| 3,761,242 | 9/1973 | Finkl | 75/13 |
| 4,483,709 | 11/1984 | Schempp et al. | 75/10.42 |
| 4,504,307 | 3/1985 | Lugscheider et al. | 75/10.19 |

FOREIGN PATENT DOCUMENTS 2525755 10/1983 France .

Primary Examiner—Peter D. Rosenberg
Attorney, Agent, or Firm—Stanley Ktorides

[57] ABSTRACT

A melting furnace and method for melting metal comprising the injection of inert gas into molten metal at a defined location as a concentrated plume to create localized surface agitation, and high quality refractory surrounding the gas injection means at the furnace bottom.

14 Claims, 4 Drawing Figures

4,699,654

MELTING FURNACE AND METHOD FOR MELTING METAL

TECHNICAL FIELD

This invention relates to the field comprising electric arc furnaces and methods of melting metal and is an improvement whereby the metal is melted with lower energy consumption and with improved homogeniety.

BACKGROUND ART

An electric arc furnace comprises a relatively short, wide, cylindrical enclosure having a relatively wide and shallow hearth within which metal, such as steel, is melted. Generally the furnace bottom is lined with two layers of refractory comprising a lower layer of refractory, which is intended to last for a long time, such as several years, and an upper layer of refractory, which comes in contact with molten metal and which is intended to last for only a small number of heats before replacement or patching. An electric arc furnace also has at least one electrode, and generally has three electrodes, which provide an electric arc among themselves and/or between themselves and localized areas of the metal which is to be melted within the hearth. These arcs heat and melt the metal. After the metal is melted it is poured out of the melting furnace and into a ladle from which it is poured into molds to produce cast products or into a refining vessel to produce further refined metal.

Since the arc heating within the furnace hearth is localized, the sections of the hearth furthest from the electrodes receive heat at a slower rate than areas closer to the electrodes, and the metal at such distant sections is slower to melt resulting in longer melt times with consequent high energy consumption. Furthermore, the localized nature of the arc heating and melting causes chemical and thermal stratification through the depth of the molten metal, which may cause operational problems due to errors in characterizing the molten bath because of its inhomogeneous nature.

Those skilled in the art of melting metal in an electric arc furnace have addressed this problem of inefficient melting in a number of ways.

One such method comprises the use of plasma or oxy-fuel burners or oxygen lances to produce additional heat directed at the cold regions within the furnace hearth. While such auxiliary burners may be effective, they are also complicated and costly to operate and their effectiveness decreases when larger size pieces of metal are to be melted. Furthermore, the burners or lances may oxidize the metal within the hearth which decreases the yield of the melting process and further decreases the process efficiency.

Another method employed by steelmakers to increase melting efficiency in an electric arc furnace is to stir the molten metal so that it flows over and around the not yet melted metal thus increasing the heat distribution rate and consequently increasing the melting rate.

One known method of stirring the hearth contents of an electric arc furnace is by induction stirring wherein a magnetic field is set up within the hearth and the metal is moved or stirred magnetically. Disadvantages of this method include the expense of the required induction stirring coils and controls, the necessity of providing the furnace with a non-magnetic, such as a stainless steel, bottom, the susceptibility of the induction stirring device to damage caused by inadvertent leaks or overflow of molten metal, and the fact that induction stirring can provide only a certain degree of stirring which may be less than the degree of stirring desired.

Another known method of stirring the hearth contents of an electric arc furnace is by injection of inert gas into the molten metal through a permeable or porous element such as a refractory piece. Disadvantages of this method include unreliability and the likelihood of the permeable or porous element becoming blocked, complicated and costly installation requirements, the possibility of sudden failure leading to steel leakage out the bottom of the furnace, and incompatibility with the use of carbon dioxide as the stirring gas due to a tendency of carbon dioxide to oxidize and erode the porous refractory element.

It is therefore an object of this invention to provide a method to melt metal in an electric arc furnace with improved efficiency over heretofore available melting methods.

It is another object of this invention to provide an improved melting furnace to enable melting of metal in an electric arc furnace with improved efficiency.

SUMMARY OF THE INVENTION

The above and other objects which will become apparent to one skilled in the art upon a reading of this disclosure are attained by this invention one aspect of which is:

In a method for melting metal in a melting furnace having a relatively wide and shallow hearth and equipped with at least one melting electrode, wherein the metal proximate the electrode(s) melts prior to the metal proximate the furnace walls, the improvement comprising: injecting inert gas through gas injection means through the bottom of the furnace into the molten metal in a concentrated plume to create localized agitation on the molten metal surface substantially above only the inert gas injection point(s), said injection point(s) being substantially removed from the center of the hearth so that the localized agitation (1) splashes substantially no metal onto the electrode(s) and (2) accelerates melting of the solid metal proximate the furnace walls by the rapid transfer of heat from the molten to the solid metal.

Another aspect of this invention comprises:

A melting furnace comprising:

(a) a relatively wide and shallow hearth having a bottom comprising at least one layer of refractory;

(b) at least one electrode within the furnace interior;

(c) at least one gas injection means passing through the hearth bottom through the hearth refractory layer(s), and communicating with the hearth interior, and (d) high quality refractory surrounding at least some portion of the upper length of the gas injection means which passes through the hearth refractory layer(s).

As used herein, the terms "upper, lower, top and bottom" when used with respect to the melting furnace or gas injection devices describe the melting furnace or devices in their normal operation position.

As used herein, the term "electrode" means an electrical conductor, generally graphite or amorphous carbon, capable of being given a high electrical potential for the purpose of discharging an electrical arc.

As used herein, the term "inert gas" means a gas which does not cause harmful reaction with a given molten metal and provides cooling to the gas injection means at the injection point.

As used herein, the term "high quality refractory" means any refractory material having a slow wear rate relative to the wear rate of the layer of hearth refractory comprising the portion of the hearth bottom intended for contact with the molten metal bath.

As used herein, the term "tuyere" means metal, such as stainless steel, conduit(s) used for passing gas(es) through a wall or hearth of a metallurgical vessel.

DETAILED DESCRIPTION

The method of this invention comprises the discovery that injection of inert gas at a defined location as a concentrated plume into molten metal produces more efficient melting in an electric arc furnace than is attainable with diffuse inert gas injection. Due to the relatively shallow hearth of an electric arc furnace, inert gas injection as a concentrated plume has been heretofore considered impractical due to expected high degree of undesirable splash and to expected excessive turbulence. Furthermore, the required repair of the hearth refractory layer which comes in contact with the molten metal, as well as possible formation of solidified slag and steel after discharging a heat of metal, can very easily lead to blockage of an injection device and loss of stirring efficiency.

Preferably the inert gas is injected into the molten metal through at least one tuyere, such as an annular tuyere, which passes through the bottom of the electric arc furnace hearth and communicates at one end with a source of inert gas and at the other end with the hearth interior Among the inert gases useful in the practice of the method of this invention one can name argon, nitrogen, carbon dioxide, helium, carbon monoxide, hydrogen, steam, hydrocarbons, and mixtures thereof.

The method of this invention may be used to melt a great many metals among which one can name steel, iron, copper, aluminum, nickel and nickel alloys, and ferroalloys.

The method of this invention can be practiced in conjunction with any electric arc furnace. Electric arc furnaces for melting metal are well known to those skilled in the art and no further discussion is necessary here. Examples of typical electric arc furnaces are illustrated, for example, in U.S. Pat. Nos. 4,483,709 and 4,504,307.

Figure 1:
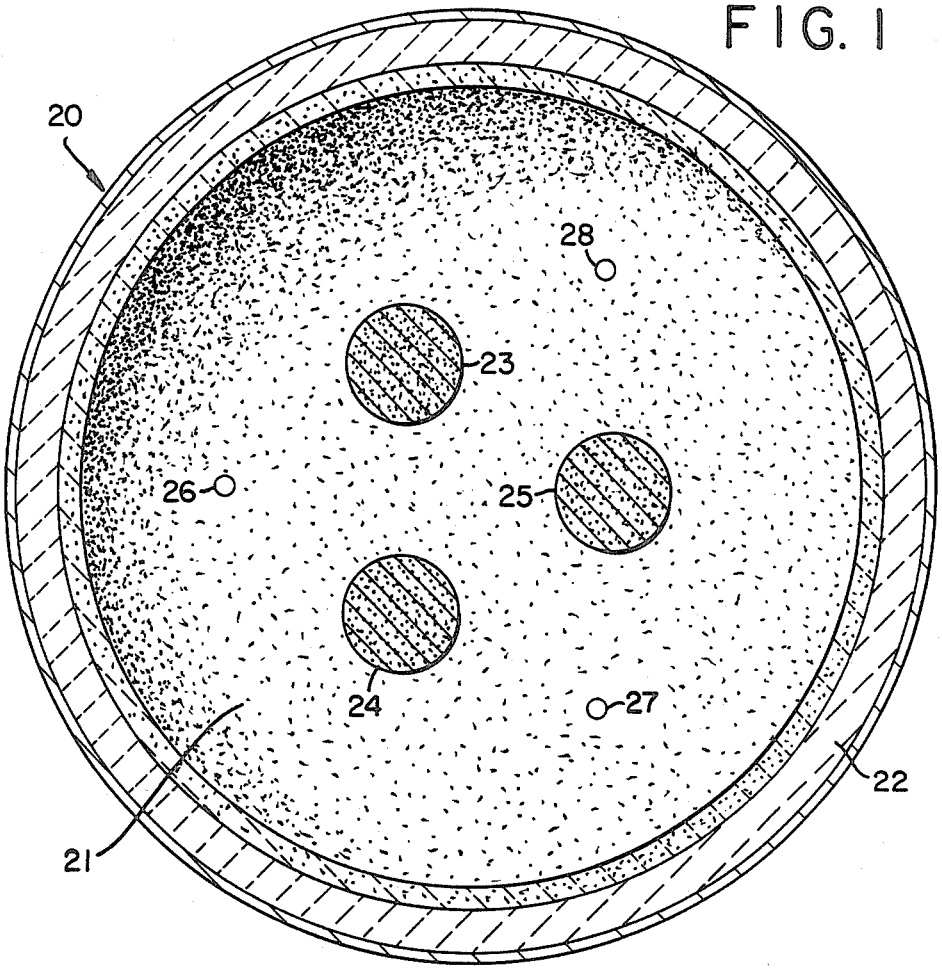
FIG. 1 is a plan view of an electric arc furnace hearth showing a particularly preferred electrode and tuyere arrangement.

Generally and preferably the electric arc furnace for the practice of this invention will have three electrodes placed in a triangular or delta arrangement. FIG. 1 is a plan view of an electric arc furnace having his preferred electrode arrangement. Referring now to FIG. 1, electric arc furnace 20 comprises hearth interior 21 defined by hearth wall 22. Within the furnace interior are three electrodes 23, 24 and 25 in a triangular or delta arrangement. FIG. 1 also illustrates a preferred tuyere arrangement wherein the tuyeres 26, 27, and 28 are each located outside the perimeter of the electrode arrangement and between the corners of the electrode arrangement. In this way, inert mixing gas is passed through the tuyeres into the molten steel at what would be expected to be the colder regions of the furnace hearth thus maximizing the improvement in heat distribution due to mixing. Most preferably the tuyeres are located at least 50 percent of the hearth radius away from the hearth center.

Inert gas is injected into the molten metal at a pressure which is generally within the range of from 25 to 250, and preferably within the range of 50 to 125, pounds per square inch gauge (psig), and at a flow rate which is generally within the range of from 1 to 40, and preferably within the range of 2 to 20, standard cubic feet per minute (SCFM) per tuyere or other gas injection means. In this way, the inert gas passes up through the molten metal in a concentrated plume and in sufficient quantity to provide the required degree of bath stirring without undesirable splash and excessive agitation. Applicants have found that when the inert gas is injected into the molten metal as a concentrated plume, especially when the preferred tuyere and electrode arrangement, such as is illustrated in FIG. 1, is employed, an unexpected reduction in energy usage and a consequent improvement in process efficiency is observed.

In an electric arc furnace melting process the metal proximate the generally centrally located electrode(s) melts prior to the metal proximate the furnace walls and this unmelted metal may take a long time to fully melt, resulting in long melting times and high energy usage. The method of this invention injects inert gas into the molten metal in a concentrated plume and creates a localized surface agitation on the molten metal surface. This agitation is sufficiently removed from the hearth center so that metal is not splashed onto the electrode(s) since such splashing would cause undesirable wear of the electrode and interfere with its normal operation. Preferably the gas injection point(s) and consequent surface agitation are at least 50 percent of the distance from the hearth center to the walls. The localized agitation creates turbulence which serves to rapidly transfer heat from the molten to the solid metal. This accelerates the melting of the solid metal at the furnace periphery thus reducing melting times and energy usage.

Figure 2:
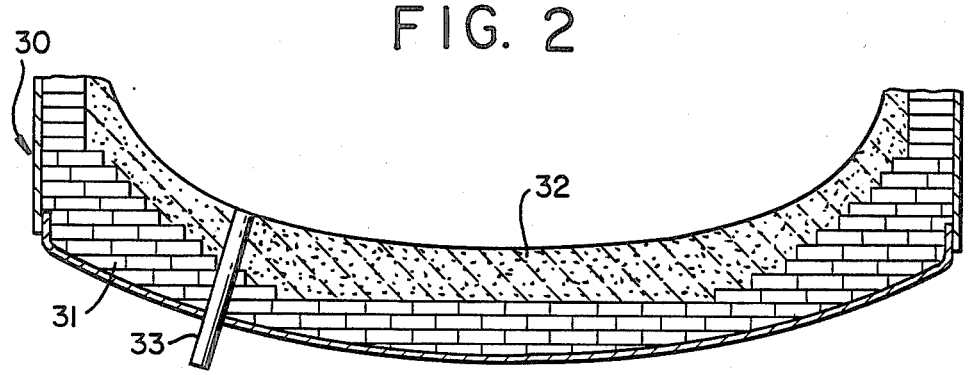
FIG. 2 is an elevational cross-sectional view of an electric arc furnace hearth which can be used to practice the method of this invention.

FIG. 2 is a cross-sectional view in elevation of the lower portion 30 of an electric arc furnace showing a typical electric arc furnace bottom comprising a bottom layer 31 of refractory, designed to give several years of service before replacement, and an upper layer 32 of refractory which is intended to be sacrificial and is patched or partially replaced as required to maintain the desired hearth location and configuration. In the practice of the method of this invention, the inert gas is injected into the molten metal though the bottom of the furnace, such as through tuyere 33, in a concentrated plume. The tuyere may be installed, for example, by drilling a hole of sufficient clearance through the furnace bottom, filling the hole with a refractory slurry of suitable consistency, inserting the tuyere from outside the furnace, and securing the tuyere assembly to the furnace shell by means of a bolted flange or other suitable attachment mechanism.

After the metal is melted, it is poured out of the electric arc furnace into a ladle and then into molds to make castings, or into a refining vessel such as an argon-oxygen decarburization (AOD) vessel for further refining. After the molten metal is poured out of the furnace some molten metal and slag remains in the vessel and could cause blockage of the gas injection means as it solidified. In order to overcome this problem, the method of this invention may be practiced with one or more of the following procedures. After the molten metal is tapped from the furnace the gas flow and pressure through the tuyeres may be increased during the period of time that the residual slag and metal is draining back down to the furnace bottom and solidifying. Another procedure comprises using porous refractory to patch the furnace bottom at the tuyeres to provide a refractory layer over the tuyere which in turn provides a preferred low pressure drop route for the exiting gas to reach the hearth interior. Still another procedure involves placing the tuyeres closer to the wall of the furnace and away from the center of the hearth which has a greater depth.

One reason that tuyeres have not been heretofore employed in electric arc furnaces is that they would be consumed too easily because a large portion of the tuyere would pass through sacrificial refractory.

Figure 3:
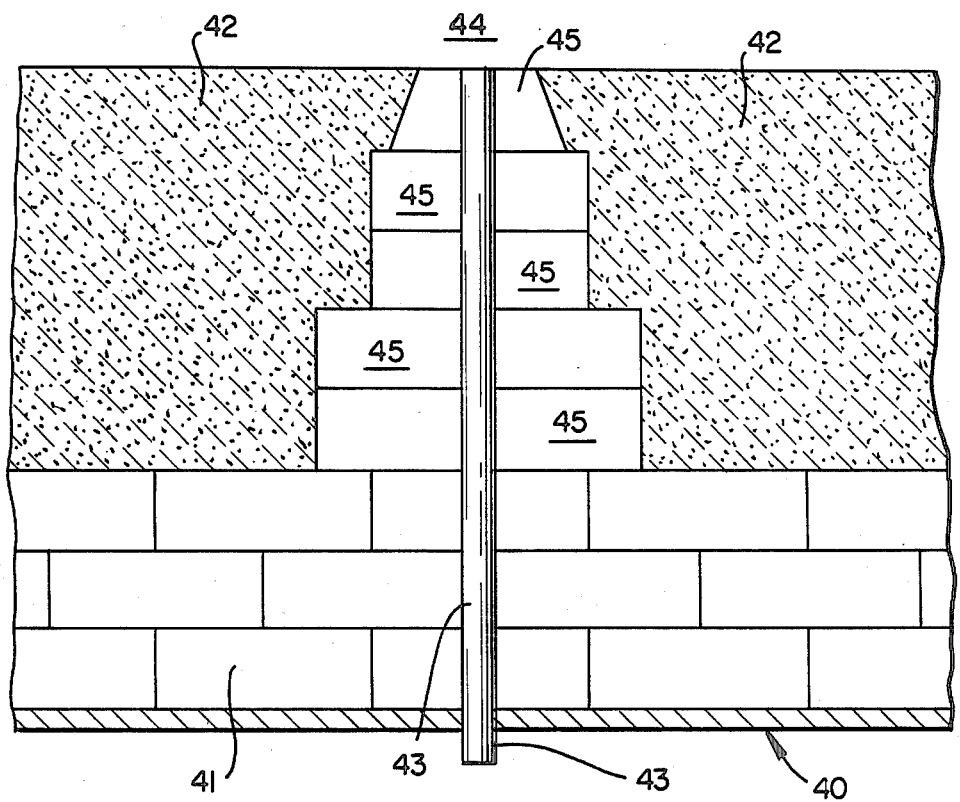
FIG. 3 is one embodiment of a tuyere block useful in the melting furnace of this invention.
Figure 4:
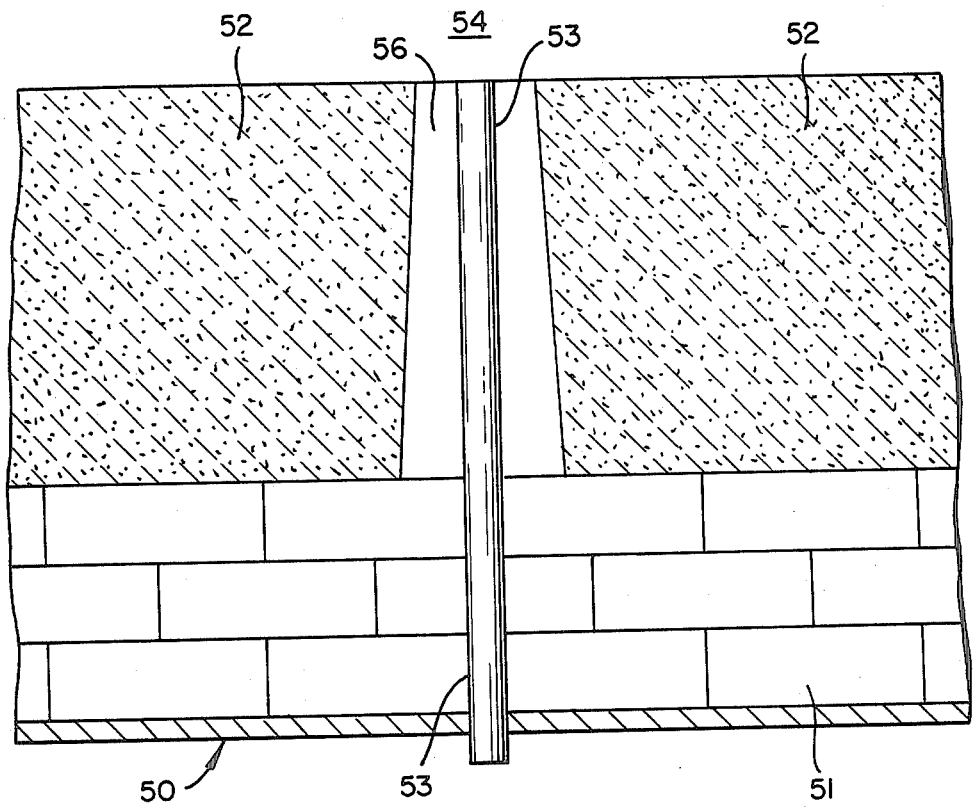
FIG. 4 is another embodiment of a tuyere block useful in the melting furnace of this invention.

Applicants have solved this localized wear problem by a tuyere block, two embodiments of which are illustrated in FIGS. 3 and 4. Referring to FIG. 3, furnace shell 40 is covered with a lower layer of refractory 41, in this case refractory brick, and an upper layer of refractory 42 such as rammed refractory material. Tuyere 43 passes through shell 40 and layers 41 and 42, and communicates with hearth interior 44. At least some portion of tuyere 43 which passes through layer 42, and in this case the entire portion, is surrounded by high quality refractory, such as the high quality refractory pieces 45 shown in FIG. 4. Examples of high quality refractory include high density bricks or shapes based on MgO, MgO-CaO, MgO-$Cr_2O_3$, $Al_2O_3$, and/or $SiO_2$; commercial embodiments include Corhart RFG and Corhart Isopress RFG. The pieces each have an opening through which the tuyere passes and preferably the pieces are smaller at the top than at the bottom of layer 42. In this way, even though layer 42 is worn away relatively quickly, the tuyere itself wears at a significantly slower rate, remains a high spot on the bottom profile, and is inherently more resistant to blockage by slag or metal solidification. The worn refractory layer 42 is patched or replaced after a few heats and thus, due to tuyere block 45, tuyere 43 can function for a large number of heats. The tuyere block of this invention can be advantageously employed with any gas injection means and may even be used with porous element gas diffusers.

FIG. 4 illustrates another embodiment of the tuyere block of this invention. The numerals in FIG. 4 correspond to those of FIG. 3 plus 10 for the common elements. As shown in FIG. 4, tuyere block 56 is a unitary piece of high quality refractory having a passage therethrough for tuyere 53 and is of a size sufficient to extend from the the top of layer 52 to a point sufficient to give the required protection. Preferably tuyere block 56 has an increasing radial cross-section downward from the top of layer 52.

The following examples serve to further illustrate the invention. These are provided for illustrative purposes and are not intended to be limiting.

EXAMPLE 1

Three tuyeres of the type shown in FIG. 1 were installed in a twenty ton electric arc furnace having three electrodes. The electrode and tuyere arrangement was similar to that shown in FIG. 1. Type 300 stainless steel scrap was introduced into the furnace and melting was initiated. Nitrogen gas was passed through each tuyere at a rate of 2.2 SCFM per tuyere and at a pressure of 60 psig and was injected into the molten metal as a concentrated plume from each tuyere creating localized agitation on the molten metal surface above the injection points. No molten metal was splashed onto the electrodes. The metal proximate the electrodes melted prior to the metal proximate the furnace wall. The procedure continued until all the steel was melted and the total energy required to melt the steel charge was calculated. The procedure was repeated 13 more times and the average melting energy for the 14 heats melted by the method of this invention was 484.4 kilowatt-hours per ton of metal (kwh/t).

For comparative purposes the procedure described above was repeated except that no inert gas was injected through the tuyeres, i.e., there was no stirring. Sixteen such comparative heats were carried out and the average melting energy for these comparative heats was 511.1 kwh/t.

For comparative purposes the procedure described above was repeated except that one or more of the tuyeres was blocked off so that the inert gas flowed into the molten metal from such tuyere not as a concentrated plume but in a diffuse manner without creating surface agitation above such injection point. The gas flow was the same as previously at 2.2 SCFM per tuyere. Twelve such comparative heats were carried out and the average melting energy for these comparative heats was 503.3 kwh/t.

As can be seen from the example of this invention and from the comparative examples, the method of this invention comprising injection of inert gas as a concentrated plume at defined locations enabled a 5.4 percent reduction in melting energy over that required when no stirring was used and a 3.9 percent reduction in melting energy over that required when diffuse stirring was used.

EXAMPLE 2

The ability to employ nitrogen as the inert gas for stirring enables the electric arc furnace operator to alter the nitrogen content of the molten metal and this increases the capability of the operator to control the metal nitrogen content. This capability is demonstrated in this Example 2.

A number of heats were carried out using the procedure of this invention as described in Example 1 and the nitrogen content of the melt was measured when the melt was tapped. One heat was stirred solely with argon. three with nitrogen for 40 percent of the time followed by argon, nine with nitrogen for 75 percent of the time followed by argon, and eleven solely with nitrogen. The melt nitrogen content for each heat was then averaged by category and is shown in Table I. For comparative purposes four heats were carried out without stirring and the average melt nitrogen content for these heats is also shown in Table I.

TABLE I

| Stirring Time | | Tap Melt |
|---|---|---|
| % N₂ | % Ar | N % |
| 0 | 0 | 0.040 |
| 0 | 100 | 0.029 |
| 40 | 60 | 0.036 |
| 75 | 25 | 0.045 |
| 100 | 0 | 0.048 |

As clearly demonstrated by the results of this Example 2, one can now effectively increase or decrease the nitrogen content of steel during melting in an electric arc furnace by use of the melting method of this invention and by altering the degree to which nitrogen is employed as the stirring gas.

Now by the use of the method and melting furnace of this invention one can more efficiently melt metal in an electric arc furnace and furthermore can employ gas injection means such as tuyeres without the high degree of plugging or wear that would otherwise have been expected with conventional melting furnaces. Although the method and apparatus of this invention have been described in detail with reference to certain specific embodiments, it is recognized that there are a number of other embodiments of this invention which fall within the scope and spirit of the claims.

We claim:

1. A method for melting metal in a melting furnace having a hearth and equipped with a least one melting electrode comprising: injecting inert gas through gas injection means through the bottom of the furnace into molten metal to agitate the molten metal surface substantially above only the inert gas injection point(s), said injection point(s) being substantially removed from the center of the hearth so that the agitation (1) splashes substantially no metal onto the electrode(s) and (2) accelerates melting of solid metal by the rapid transfer of heat from molten to solid metal.

2. The method of claim 1 wherein the gas injection means comprises at least one tuyere.

3. The method of claim 1 wherein the inert gas is injected into the melt through at least three injection points.

4. The method of claim 1 wherein each injection point is further from the hearth center than are any of the electrodes.

5. The method of claim 1 wherein each inert gas injection point is at least 50 percent of the hearth radius removed from the hearth center.

6. The method of claim 1 wherein said metal is steel.

7. The method of claim 1 wherein said inert gas is nitrogen.

8. The method of claim 1 wherein said inert gas is argon.

9. The method of claim 1 wherein said inert gas is carbon dioxide.

10. The method of claim 1 wherein three electrodes are employed and the inert gas is injected into the molten metal from points outside of the perimeter formed by the electrodes, between electrodes, and at least 50 percent of the hearth radius removed from the hearth center.

11. The method of claim 1 wherein the inert gas is injected at a rate within the range of from 1 to 40 SCFM per gas injection means and at a pressure within the range of from 25 to 250 psig.

12. The method of claim 1 further comprising providing high quality refractory around said gas injection means for at least a portion of its upper length.

13. The method of claim 1 further comprising passing molten metal out of the furnace and increasing the pressure and the flowrate of the inert gas flowing through the gas injection means during the time residual melt which is left in the furnace is solidifying.

14. The method of claim 1 wherein the final nitrogen content of the molten metal is either increased or decreased by injection of a quantity of nitrogen which may vary from 0 to 100 percent of the total amount of injected gas.

* * * * *

UNITED STATES PATENT AND TRADEMARK OFFICE
CERTIFICATE OF CORRECTION

PATENT NO.   : 4,699,654

DATED        : October 13, 1987

INVENTOR(S)  : W.J. Maddever et al

It is certified that error appears in the above-identified patent and that said Letters Patent is hereby corrected as shown below:

On the title page, at the filing date delete "Apr. 8, 1988" and insert therefor --Apr. 8, 1986--.

In column 6, lines 60 and 61 between "argon" and "three" delete the period and insert therefor a comma.

Signed and Sealed this

Ninth Day of February, 1988

Attest:

DONALD J. QUIGG

*Attesting Officer*    *Commissioner of Patents and Trademarks*